United States Patent

Sonntag

[15] 3,672,090
[45] June 27, 1972

[54] ANIMAL TRAP

[72] Inventor: William B. Sonntag, 2939 Valley View Drive, Fairborn, Ohio 45324

[22] Filed: Feb. 18, 1971

[21] Appl. No.: 116,389

[52] U.S. Cl. ............................................................43/66
[51] Int. Cl. ..............................A01m 23/08, A01m 23/18
[58] Field of Search....................43/66, 65, 61, 100, 102, 105

[56] References Cited

UNITED STATES PATENTS

| | | | |
|---|---|---|---|
| 1,911,919 | 5/1933 | Molls | 43/66 |
| 2,234,985 | 3/1941 | Simonds | 43/65 |
| 2,760,297 | 8/1956 | Buyken | 43/105 |

Primary Examiner—Warner H. Camp
Attorney—Wood, Herron & Evans

[57] ABSTRACT

A collapsible box-like animal trap of the type which includes inwardly sloping end walls or doors which are pivotable about the top and engage the bottom of the trap at a point spaced inwardly from the front edge of the bottom wall. The ends are held closed by gravity such that animals may push the bottoms of the doors inwardly and upwardly to an open position and thereby gain access to the interior of the trap but may not push it outwardly to obtain their freedom. The walls of the trap are all hingedly interconnected and side walls of the trap are collapsible inwardly about medial hinges located midway up the side walls such that the complete trap may be collapsed by folding the doors inwardly against the top of the trap and by folding the side walls inwardly until the medial hinge line of each side wall is located in juxtaposition to the medial hinge of the opposite side wall. To hold the trap in an erected position, a U-shaped stake extends upwardly along one side wall over the top and down the other side wall and passes through loops attached to the side walls at points spaced from the corners. The bottom ends of the U-shaped stake extend into the ground and serve the function not only of holding the trap in an erected condition but preventing it from being rolled by an entrapped animal.

6 Claims, 3 Drawing Figures

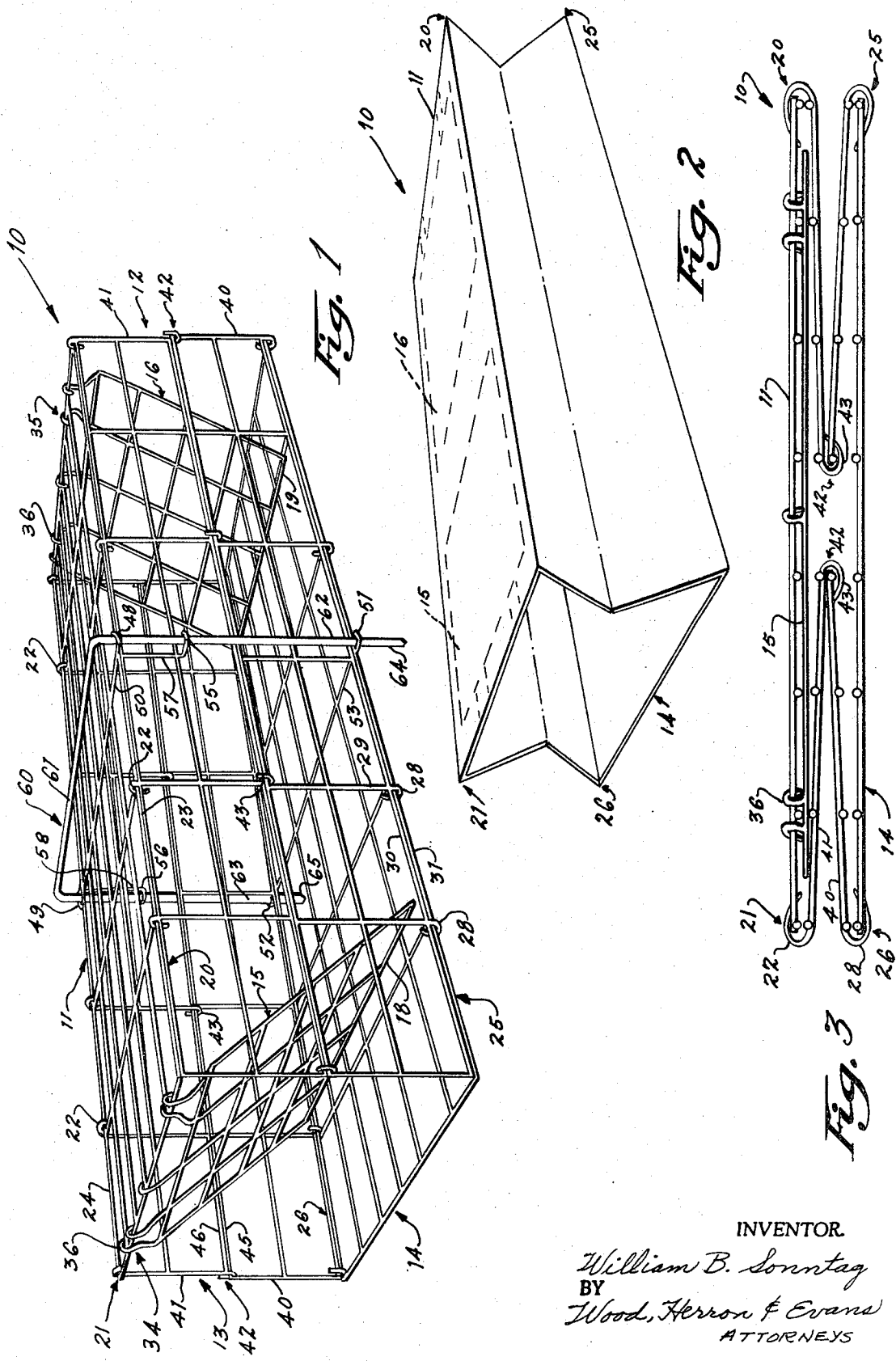

ANIMAL TRAP

This invention relates to animal traps and more particularly to a collapsible trap for entrapping live animals without harming them.

One of the problems encountered by animal trappers is that of transporting the traps to the trapping site. This problem is particularly acute when a trapper transports numerous traps over long distances. Live animal traps of the type which are intended to trap the animals without harming them are generally box-like structures of large volume. Handling these boxes at any time is a difficult task but handling or transporting multiple boxes or traps of this type in the woods is particularly difficult. It has therefore been an objective of this invention to reduce or minimize this problem by providing an easily collapsible box-like animal trap which may be easily erected in the field.

One common type of animal trap is that which includes a pivoted door at one end of a box-like structure, through which an animal may enter by pushing the door inwardly about an upper hinge. The end or door of the trap is longer than the height of the box so that the door normally slopes downwardly and inwardly and contacts the bottom of the trap at a point spaced some distance from the front end of the bottom wall. An animal may therefore push the door open to enter the trap but cannot push it to an open position to escape.

It has been another objective of this invention to provide a sloping door animal trap which may be easily collapsed and transported through the field.

One of the problems with sloping door type animal traps is that they rely on gravity to hold the door closed and maintain the animal trapped inside. If the animal is successful in rolling the trap over onto its side, as often occurs when an entrapped animal tries to climb the side walls, etc., the doors are no longer held closed by gravity and the animal may escape. Therefore, it has been another objective of this invention to provide a collapsible sloping door type of animal trap which may be easily staked to the ground so as to prevent its being rolled by an entrapped animal.

The trap which accomplishes these objectives consists of a box-like structure having horizontal hinges located medially of the side walls of the trap. These side walls may be pushed inwardly after the end walls are pushed up against the top to collapse the trap. To hold the trap in an erected condition, there are loops located on the exterior of the side walls. The U-shaped stake extends downwardly through these loops to hold the side walls erected and has end prongs which extend into the ground to prevent the trap from being rolled by an entrapped animal.

These and other objects and advantages of this invention will be more readily apparent from the following description of the drawings, in which:

FIG. 1 is a perspective view of a trap embodying the invention of this application.

FIG. 2 is a diagrammatic illustration showing the manner in which this trap is collapsed.

FIG. 3 is an end elevational view of the trap in the collapsed condition.

Referring first to FIG. 1, it will be seen that the trap 10 of this invention comprises a box-like structure having a top wall 11, a pair of side walls 12, 13, a bottom wall 14, and a pair of end walls or doors 15, 16. To facilitate collapsing of the trap, the top and bottom walls 11, 14 are hingedly or pivotally connected to the top and bottom edges or corners of the side walls 12 and 13, respectively, and the end walls 15, 16 are pivotally connected to the front and rear ends of the top wall. The length of the end walls is greater than the height of the side walls so that when the trap is erected, the end walls extend inwardly at an angle of approximately 30° from the top wall. The bottom edges 18, 19 of the end walls 15, 16 engage the bottom wall 14 at a point spaced inwardly from the ends of the bottom wall such that the end walls cannot be forced outwardly by an animal trapped inside the trap or box-like structure.

All of the walls, including the top 11 and bottom walls 14, the two side walls 12, 13, and the end walls 15, 16, are made from straight rods which are welded together in an open mesh arrangement. The hinges between adjacent corners of the walls are formed by loops in the ends of the side wall and end wall wires. Specifically, the hinges 20, 21 between the top wall and the two side walls are formed by loops 22 in the ends of the vertical side wall wires being bent around the longitudinal corner wires 23, 24 of the top and side walls. Similarly, the hinges 25, 26 between the bottom wall 14 and the two side walls 12, 13 are formed by loops 28 bent into the ends of the vertical wires 29 of the side walls and looped around the longitudinal corner wires 30, 31 of the bottom and side walls. The end wall or door hinges 34, 35 of the door 15, 16 are formed by loops 36 bent into the top end of each of the vertical end wall wires and looped over the endmost cross rod or wire of the top panel or wall 11. This construction provides an inexpensive, lightweight open mesh wall structure which may be easily and inexpensively hingedly connected to the adjacent wall panels to form the collapsible box-like construction.

In order to enable the trap to be collapsed, in the manner diagrammatically illustrated in FIG. 2, each side panel is made from two sections 40, 41 hingedly connected together by a horizontal hinge 42 located medially of the height of each wall. This hinge 42 is formed by bending end portions 43 of the vertical rods of the upper section 41 about juxtapositioned horizontal rods or wires 45, 46 of the two sections 40, 41 located at the top of the bottom section and at the bottom of the top section.

To collapse the trap, all that is required is to fold the end walls 15, 16 upwardly against the top wall 11 of the trap and then push the side walls 12, 13 inwardly upon themselves until the medial hinges 42 of each of the side walls are located in juxtaposition, as illustrated in FIG. 3. In this position the trap may be easily transported or shipped.

In order to enable the trap to be erected and held in an erected condition, there are horizontally extending loops located along the side walls 12 and 13. Two of these loops 48, 49 are formed in the ends of a cross wire 50 of the top panel and two loops 51, 52 are formed in the ends of the cross wire 53 of the bottom wall 14. There is also another loop 55, 56 formed in each side wall near the medial hinge by the end of a vertical wire 57, 58. The loops 48, 55 and 51 along one side and the loops 49, 56, 52 along the other side are all coaxially aligned in a vertical plane along the exterior of the side walls when the trap is erected, as illustrated in FIG. 1. As may be seen most clearly in FIG. 1, a U-shaped stake 60 having a horizontal section 61 and parallel vertical legs 62, 63 is located over the top of the erected trap. The vertical legs 62, 63 extend along the side walls of the trap and pass through the side wall loops 48, 55, 51 and 49, 56, 52, respectively. Thus the side walls of the trap are restrained by the vertical legs of the U-shaped bracket or stake 60 against collapsing either inwardly or outwardly. The lower ends 64 and 65 of this stake preferably extend beneath the bottom of the trap when the horizontal section 61 of the U-shaped stake is located adjacent the top of the trap. These ends are sufficiently long to extend into the ground when the trap is erected so as to prevent an entrapped animal from rolling the trap onto its side and then opening the door while the trap is located on its side or is upside down. The U-shaped bracket, though, extending over the top of the trap and down the sides and into the ground precludes rolling of the trap while simultaneously maintaining it in an erected condition. To collapse the trap, all that is required is to remove the stake 60 by pulling it upwardly out of the side wall loops, to fold the doors up against the top wall 11, and to collapse the side walls 12, 13 inwardly about their medial hinges 41,42.

While I have described only a single preferred embodiment of my invention persons skilled in the art to which this invention pertains will readily appreciate numerous changes and modifications which may be made without departing from the spirit of my invention. Therefore I do not intend to be limited except by the scope of the appended claims.

Having described my invention, I claim:

1. A foldable trap for use in trapping small animals comprising a foldable box which in its folded position has its opposite ends folded inwardly from the top thereof and has its opposite sides formed in substantially equal upper and lower sections which are hinged together and to the top and bottom of the trap, respectively, and in their folded positions are folded inwardly on themselves beneath said folded ends and immediately above the bottom of the trap, said opposite ends being pivotally connected along the top edge to one end of the top of the trap, at least one end in the unfolded position extending angularly inwardly from the top to the bottom so as to form a trap door which may be pushed inwardly by an entering animal but which cannot be pushed outwardly, the improvement which comprises loops attached to said opposite sides near the point where the said upper and lower sections of said sides are hinged together, and a removable U-shaped bracket which when the trap is erected extends up one side of the trap over the top and down the other side and passes through said loops so as to maintain said trap in an erected condition.

2. The animal trap of claim 1 in which said top and bottom, said side walls and said ends are all made from rods secured together to form a large open mesh.

3. The animal trap of claim 2 in which the walls of said foldable trap are interconnected by hinges, said hinges all being formed by loops bent into the ends of selected ones of said rods and extending over rods at the corners of other walls.

4. A foldable trap for use in trapping small animals comprising a foldable box which in its folded position has its opposite ends folded inwardly from the top thereof and has its opposite sides formed in substantially equal upper and lower sections which are hinged together and to the top and bottom of the trap, respectively, and in their folded positions are folded inwardly on themselves beneath said folded ends and immediately above the bottom of the trap, said opposite ends being pivotally connected along the top edge to one end of the top of the trap, at least one end in the unfolded position extending angularly inwardly from the top to the bottom so as to form a trap door which may be pushed inwardly by an entering animal but which cannot be pushed outwardly, the improvement which comprises loops attached to said opposite sides near the point where the said upper and lower sections of said sides are hinged together, and a removable U-shaped bracket which when the trap is erected extends up one side of the trap over the top and down the other side and passes through said loops so as to maintain said trap in an erected condition, said U-shaped bracket having side wall portions which are substantially longer than the side walls of said animal trap when said trap is erected and in which the ends of said bracket are adapted to be inserted into the ground so as to prevent said trap from being rolled and turned over by a trapped animal.

5. The animal trap of claim 4 in which said top and bottom, said side walls and said ends are all made from rods secured together to form a large open mesh.

6. The animal trap of claim 5 in which the walls of said foldable box are interconnected by hinges, said hinges all being formed by loops bent into the ends of selected ones of said rods and extending over rods at the corners of the walls.

* * * * *